United States Patent [19]
Fädler et al.

[11] Patent Number: 4,537,295
[45] Date of Patent: Aug. 27, 1985

[54] CLUTCH DISC ASSEMBLY WITH TORSIONAL OSCILLATION DAMPERS

[75] Inventors: Kurt Fädler, Niederwerrn; Friedrich Kittel, Schweinfurt, both of Fed. Rep. of Germany

[73] Assignee: Fichtel & Sachs AG, Schweinfurt, Fed. Rep. of Germany

[21] Appl. No.: 438,482

[22] Filed: Nov. 2, 1982

[30] Foreign Application Priority Data

Nov. 14, 1981 [DE] Fed. Rep. of Germany ....... 3145312

[51] Int. Cl.³ .......................... F16D 3/14; F16D 3/66; F16D 13/64
[52] U.S. Cl. .................................. 192/106.2; 464/63; 464/68
[58] Field of Search .......................... 192/106.2, 106.1; 464/63, 67, 68

[56] References Cited

U.S. PATENT DOCUMENTS

| | | | |
|---|---|---|---|
| 2,042,570 | 6/1936 | Wemp | 464/68 X |
| 3,101,600 | 8/1963 | Stromberg | 192/106.2 X |
| 3,203,205 | 8/1965 | Geibel et al. | 192/106.2 X |
| 3,266,271 | 8/1966 | Stromberg | 192/106.2 X |
| 3,414,101 | 12/1968 | Binder et al. | 192/106.2 |
| 3,534,841 | 10/1970 | Schneider et al. | 192/106.2 |
| 3,578,121 | 5/1971 | Maurice | 464/68 X |
| 3,995,726 | 12/1976 | De Gennes | 464/68 X |
| 4,024,938 | 5/1977 | Maucher | 192/106.2 |
| 4,190,142 | 2/1980 | Berlioux | 192/106.2 |
| 4,212,380 | 7/1980 | Billet | 464/68 X |
| 4,366,893 | 1/1983 | Billet | 192/106.2 |
| 4,376,477 | 3/1983 | Loizeau | 192/106.2 |
| 4,412,606 | 11/1983 | Loizeau | 192/106.2 |
| 4,440,283 | 4/1984 | Nioloux | 192/106.1 X |
| 4,471,863 | 9/1984 | Lech | 464/63 X |

FOREIGN PATENT DOCUMENTS

| | | |
|---|---|---|
| 1680049 | 11/1973 | Fed. Rep. of Germany . |
| 1346144 | 11/1963 | France . |
| 1491329 | 7/1967 | France . |
| 1520684 | 3/1968 | France . |
| 2361577 | 3/1978 | France . |
| 728830 | 4/1955 | United Kingdom ............. 192/106.1 |
| 1200013 | 7/1970 | United Kingdom . |
| 2040398 | 8/1980 | United Kingdom ............. 192/106.2 |

*Primary Examiner*—Rodney H. Bonck
*Attorney, Agent, or Firm*—Toren, McGeady, Stanger, Goldberg & Kiel

[57] ABSTRACT

A clutch disc assembly particularly suited for a motor vehicle including a hub having a radially projecting annular flange with annular friction pads coaxially arranged with the hub for torque transmission therebetween. A pair of annular plate members are arranged on axially opposite sides of the friction pads and of the annular flange and an annular disc member is arranged axially adjacent the annular flange and between the annular flange and one of the annular plate members. The annular plate members and the annular disc member are rotatably mounted relative to the hub, and coupling members are provided to rotatively connect together the annular plate members and the annular disc member with the coupling members being arranged in rotative driving engagement with the hub with angular play provided therebetween. A load damper is operatively interposed between the annular friction pads and the annular plate members, and an idling damper is operatively interposed between the annular flange and the annular disc member. The idling damper is located radially inwardly of the load damper within openings formed in the annular flange of the hub, and at least one of the annular plate members is formed to extend radially alongside the idler damper. Indentations or openings formed in one of the annular plate members and the annular disc member operate to hold the idler damper within the openings of the annular flange of the hub.

25 Claims, 11 Drawing Figures

FIG.10
FIG.11
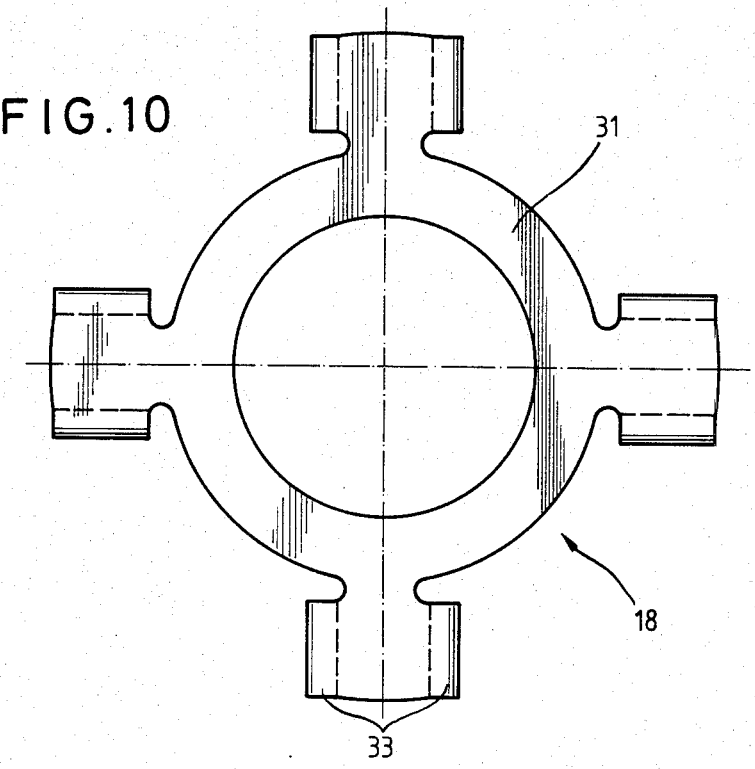
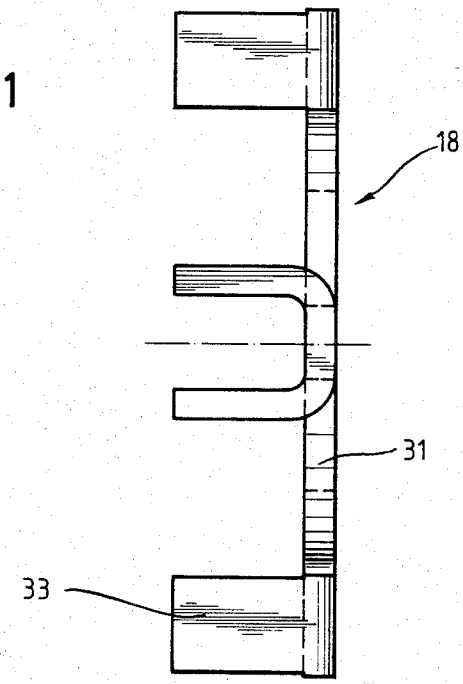

CLUTCH DISC ASSEMBLY WITH TORSIONAL OSCILLATION DAMPERS

The present invention relates generally to clutch disc assemblies and more particularly to a clutch disc having torsional oscillation damper means.

The clutch device of the type to which the present invention relates will include a hub which may be rotatably affixed to a drive shaft with a torsional oscillation damper arranged between the hub and friction pad means of the clutch arranged to be placed in torque transmitting engagement with the hub. The torsional oscillation damper may have at least one spring system for a load zone of the clutch assembly arranged on a larger median diameter of the assembly, with at least one spring system operating to provide idling or no-load damper means with the idling damper arranged on a smaller diameter than the load damper, i.e., radially inwardly thereof. The idling damper of the clutch device to which the invention relates may be blocked in accordance with a predetermined turning angle by means of stop means, and the load damper may become effective. The assembly may be provided with a pair of plate members which are formed with corresponding windows within which the torsional springs of the load damper are received.

A clutch disc of the type to which the present invention relates having torsional oscillation damper means is known in the prior art, for example from German Pat. No. 1680049. In this known arrangement, the oscillation damper for the idling zone of the clutch assembly, taken in the axial direction, is arranged adjacent the oscillation damper for the load zone. This type of arrangement tends to increase the space requirements for the clutch assembly and moreover more complicated assembly procedures and an increased number of parts tends to increase the production costs.

Accordingly, the present invention is directed toward providing a clutch disc assembly having torsional oscillation damper means for the load zone as well as the for the idling zone of the clutch operation, with the assembly being characterized in that the space requirements are minimized and that the least number of parts and simplest structural arrangement may be provided.

SUMMARY OF THE INVENTION

Briefly, the present invention may be described as a clutch disc assembly for a motor vehicle comprising a hub having a radially projecting annular flange affixed thereto, annular friction pad means coaxially arranged with the hub for torque transmission therebetween, annular plate means comprising a pair of annular plate members arranged on axially opposite sides of the friction pad means and of the annular flange, and annular disc means comprising an annular disc member axially adjacent the annular flange and arranged between the annular flange and one of the annular plate members. The annular plate means and the annular disc means are rotatably mounted relative to the hub, and coupling means rotatably connect together the annular plate means and the annular disc means, with the coupling means being arranged in rotative driving engagement with the hub with angular play being provided therebetween. Load damper means are operatively interposed between the annular friction pad means and the annular plate means, and idling damper means are operatively interposed between the annular flange and the annular disc means. The idler damper means are located radially inwardly relative to the load damper means with openings being formed in the annular flange and with at least one of the annular plate members being arranged to extend radially alongside the idler damper means. Indentation means are provided in the annular plate means and in the annular disc means for holding the idler damper means within the openings of the annular flange.

In accordance with more detailed aspects of the invention, the coupling means may comprise bolts arranged to extend through the annular flange and through the annular plate means and the annular disc means. Alternatively, bracket means may be provided as the coupling means with axially projecting tabs being arranged to effect the rotative coupling.

In accordance with the invention, the principal objects thereof are achieved in that the radial arrangement of the idling damper means within the load damper means provides a particularly space-saving arrangement in the axial direction. As a result of the additional use of one of the plate members of the annular plate means to operate to guide the springs of the load damper means and the idling damper means, the invention enables an additional part to be dispensed with insofar as the idling damper means are concerned.

Moreover, the invention provides advantages in that the coupling means which effect the rotative connection between the plate members of the annular plate means lie approximately on the same median diameter as the spring elements of the idling damper means, but are offset relative thereto in an angular circumferential distribution.

The coupling means may comprise bolts which are fixedly attached with one of the plate members and which extend through the annular disc member into engagement with the other plate member through corresponding openings. The bolts will provide rotative coupling of these parts as well as transmission of torque after bridging of the idling damper means. Moreover, the bolts of the coupling means serve to support springs which act upon two friction devices for the two zones.

Alternatively, the coupling means may, in an especially advantageous aspect of the invention, be provided in the form of bracket means which comprise a single unitary member which may, for example, be produced as a stamped part. Such a bracket member may be formed as a bracket sheet having tabs which extend from one side thereof into corresponding openings of the annular plate means, with the tabs extending through corresponding openings in the annular disc means and through openings in the hub flange into the other of the annular plate members. The bracket member with its tabs may be riveted or welded on one of the annular plate members.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 10 is an axial view of another embodiment of the coupling means of the invention; and FIG. 11 is an edge view of the embodiment of FIG. 10.

DETAILED DESCRIPTION OF THE PREFERRED EMBODIMENTS

Figure 1:
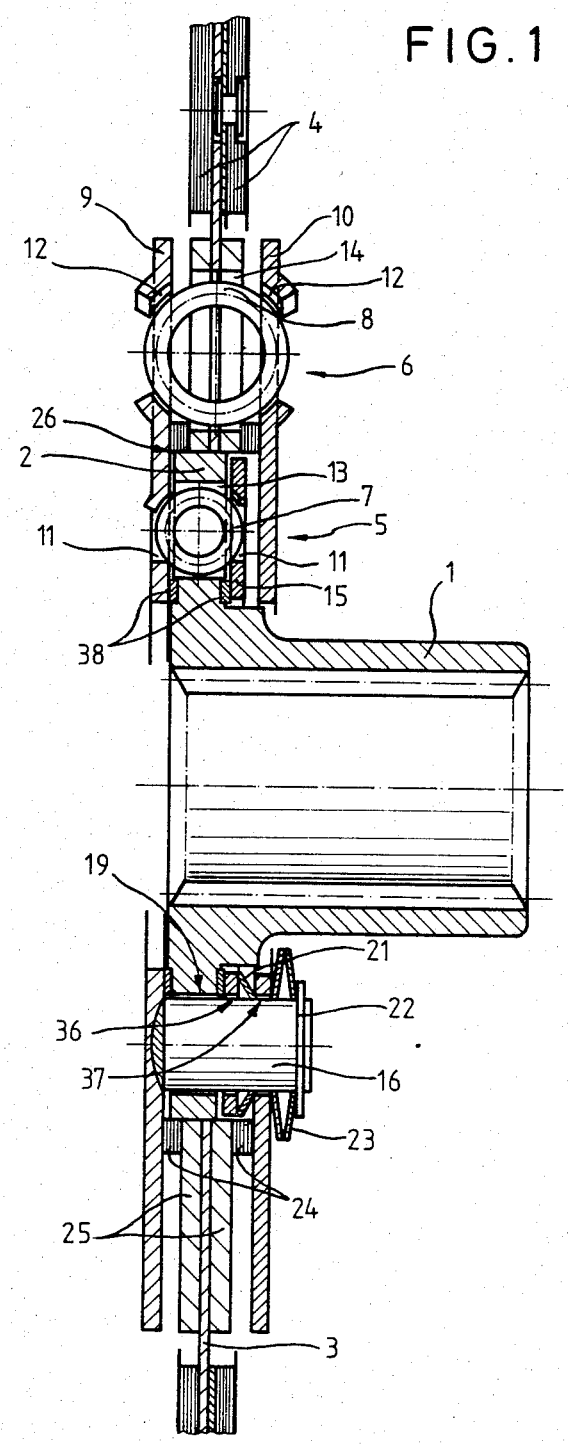
FIG. 1 is a sectional view of a clutch disc assembly in accordance with the invention taken along the line I—I of FIG. 2.
Figure 2:
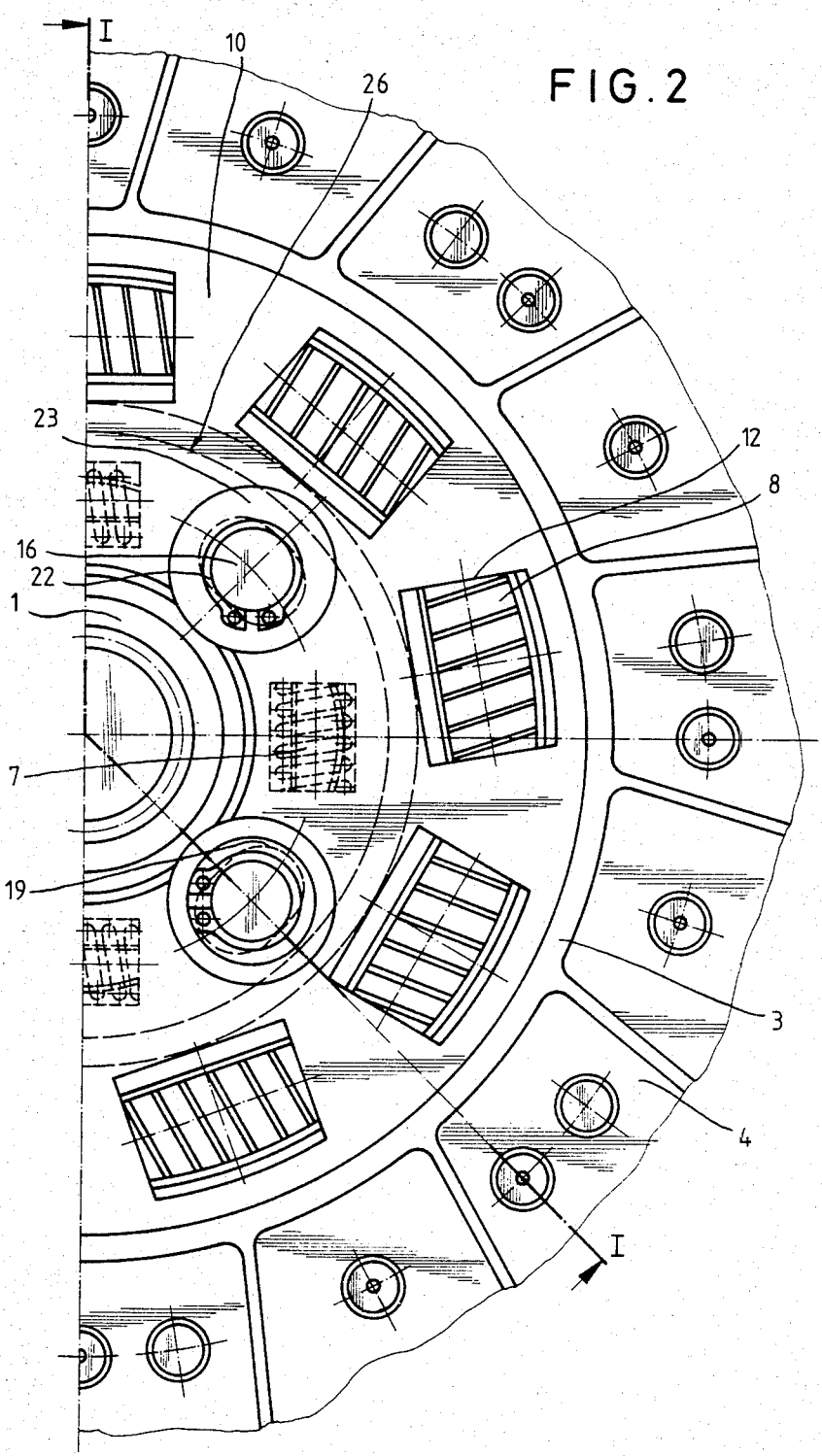
FIG. 2 is a partial axial view of the clutch disc assembly of the invention.

Referring now to the drawings, wherein similar reference numerals are used to identify like parts throughout the various figures thereof, a first embodiment of the invention is depicted in FIGS. 1 and 2 which show a clutch disc assembly comprising torsional oscillation damper means for both the idling zone and the load zone of the clutch assembly. The clutch assembly includes a hub 1 which is in rotative driving connection with a gear unit input shaft (not shown) by means of a toothed coupling. The hub is formed as a unitary member including a hub annular flange 2 within which indentation means in the form of windows or openings 13 are arranged in order to receive therein torsion springs 7 for forming an idling damper 5.

The hub annular flange 2 is enclosed on both sides by annular plate means comprising a pair of annular plate members 9 and 10 which receive therein torsion springs 8 forming a load damper 6, the torsion springs 8 being received in indentation means formed as windows or openings 12 in the plate members 9, 10. The plate member 9 is laterally juxtaposed with the annular flange 2 and the plate member 10 is arranged to be spaced a certain distance from the annular flange 2.

A pad carrier member 3 braced with a pair of reinforcing sheets 25 is rotatably supported on the outer circumference 26 of the annular flange 2. The pad carrier member 3 as well as the reinforcing sheets 25 are provided with apertures or windows 14 which correspond in angular positioning with the windows 12 in the plate members 9 and 10 in order to receive the springs 8. The pad carrier member 3 is firmly connected with friction pads 4 arranged radially outwardly of the reinforcement sheets 25.

The assembly also includes annular disc means in the form of an intermediate disc 15 which is arranged between the annular flange 2 and the plate member 10, the intermediate disc 15 also being formed with indentation means in the form of apertures or windows 11 similar to those in the plate member 9 in order to receive therein the spring 7 of the idling damper means 5. The intermediate disc 15 extends radially outwardly just short of the inner diameter of the pad carrier member 3 and the reinforcement sheets 25.

The assembly is provided with coupling means in the form of bolts 16 which are uniformly angularly distributed about the circumference of the assembly and which are provided for rotatively connecting the plate members 9 and 10 with each other as well as for rotative connection of the annular disc member or intermediate disc 15 with the plate member 9. The bolts 16 are arranged approximately on the same median diameter as the springs 7 of the idling damper 5 and they are angularly offset relative to the springs 7 in the circumferential direction. The bolts 16 are, as shown in FIG. 1, welded to the plate member 9 and extend through the disc member 15 as well as through the plate member 10 in corresponding bore holes 36 and 37, respectively. In the same manner, the bolts 16 extend through elongated holes 19 which are formed in the annular flange 2 and which enable limited turning of the idling damper 5 and, after this turning is completed, which serve to transmit torque from the friction pads 4 through the load damper 6 to the hub 1. Moreover, the bolts 16 serve to receive plate springs 21 and 23 in order to produce a friction force for the idling zone and a friction moment for the load zone. Facing toward the outside of the plate member 10, the bolts are provided with a support 22 wherein plate springs 23 are arranged between the support 22 and the outside of the plate member 10.

Friction discs 24 are arranged between the inner sides of the two plate members 9 and 10. The connection between the friction discs 24 and the outer side of the reinforcement sheets 25 results in a friction force when the load damper 6 is acted upon, which friction force may be influenced by the material of the friction discs 24 and/or by the spring force of the springs 23. The friction force for the idling damper 5 is applied by means of the arrangement of plate springs 21 between the inner side of the plate member 10 and the disc member 15 wherein friction discs are also arranged radially within the torsion springs 7 on both sides of the annular flange 2, the friction discs 38 being loaded by means of the plate springs 21.

The arrangement of individual or of several plate springs on the bolts 16 permits to a significant extent the sensitive adaptation of the friction forces to the respective operational relations of the clutch on the one side, as well as on the internal combustion engine and the drive factors of the motor vehicle on the other side. Naturally, it is also possible in principle to employ plate springs which are not arranged concentrically relative to the bolts 16, but which are arranged concentrically relative to the rotational axis of the clutch disc so that one spring may encompass all of the bolts 16.

In the operation of the clutch disc assembly depicted in FIGS. 1 and 2, during the introduction of torque by means of the friction pads 4 and with the hub 1 assumed to be in a fixed position, the load damper 6 will act as a rigid component part and will be first turned relative to the hub 1. Thus, only the torsion springs 7 of the idling damper 5 will compress. Through this, there arises a simultaneous turning of the following component parts with one another: friction pad 4; pad carrier 3; reinforcement sheets 25; torsion springs 8; plate members 9 and 10; intermediate or disc member 15; and bolts 16. This simultaneous movement is effected first of all by means of the load damper 6 which is regarded as a rigid component part during this low admission of torque, as well as through the fact that the bolts 16 are rotatively coupled with the disc member 15 and the plate member 10 in the bore holes 36 and 37, respectively. Relative movement between one plate member 9 and the intermediate disc member 15 on the one side, as well as of the flange 2 on the other side with the intermediary of the friction discs 38 also occurs. The friction discs 38, upon which axial force is applied by means of the plate springs 21, produce a certain amount of small frictional force.

After the play in the circumferential direction between the bolts 16 and the elongated holes 19 in the flange 2 is dissipated, engagement will be established between the bolts 16 and the hub 1 whereby the idling damper 5 will bridge over and will no longer be loaded. During torque which continues to increase, the employment of the load damper 6 is effected in that the pad carrier member 3, along with the friction pads 4 and the reinforcements sheets 25, will effect a continuous rotational movement relative to the other fixed component parts under the influence of compression of the torsion springs 8. In so doing, not only will the torsion springs 8 of the load damper 6 be employed, but also the friction discs 24 which are braced between the two plate members 9 and 10 by means of the plate springs 23.

Figure 3:
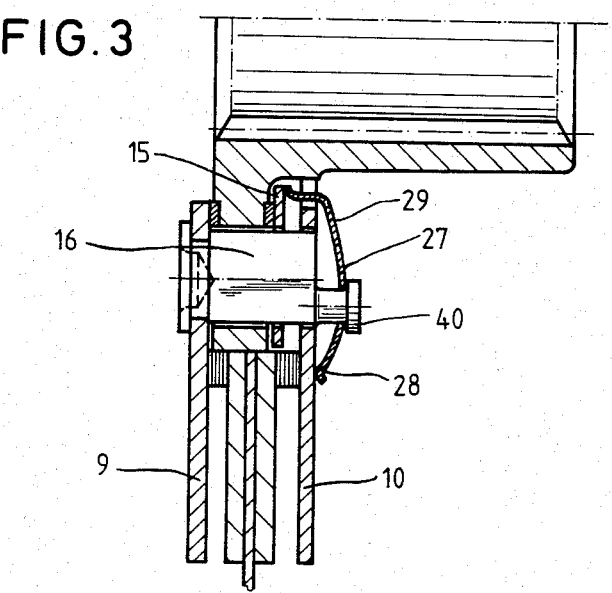
FIGS. 3 and 4 are each partial sectional views showing different embodiments of the invention.
Figure 4:
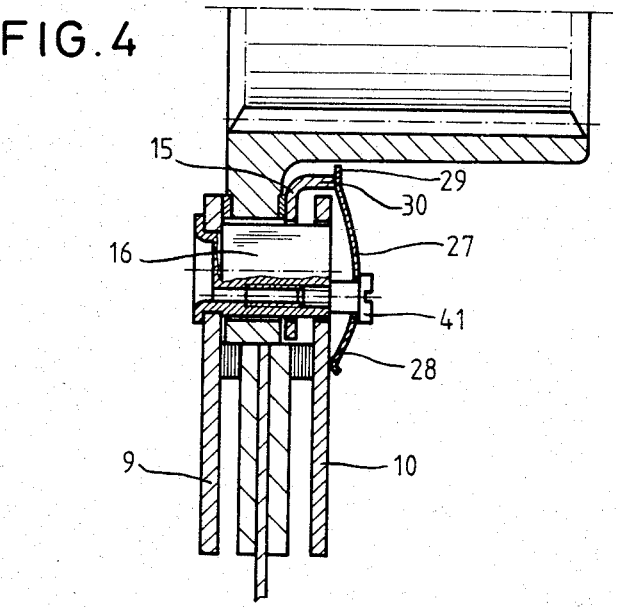

FIGS. 3 and 4 show variations of the coupling means of the clutch assembly shown in FIGS. 1 and 2, particularly with regard to the arrangement of the bolts 16 and the springs for producing the frictional forces. In each of the embodiments of FIGS. 3 and 4, the fastening of the bolts 16 is similar. In each case, the bolts are riveted in the plate member 9. Moreover, the bolts do not project over the other plate member 10 in the axial direction or, if so, only to a very slight degree. It will be noted, moreover, that instead of two different plate springs 21 and 23, there is here provided only one type of spring which is employed, that is, a spring member 27 having two arms 28 and 29. The spring member 27 is supported on the bolt 16 either by means of a rivet peg 40 or by means of a screw 41. For this purpose, the spring members 27 are formed with corresponding bore holes. Furthermore, a support is provided by means of the one arm 28 on the outside of the plate member and by means of the other arm 29 on the disc member 15. Through a corresponding selection of length of the two arms 28 and 29, it is possible to produce various axial forces with the spring member and thus also to adapt the frictional forces for the idling damper and for the load damper in a suitable manner.

The only differences between the embodiments of FIGS. 3 and 4 is that, in accordance with FIG. 4, the intermediate disc member 15 is formed with an axially projecting collar 30 on its inner periphery, which collar projects somewhat over the plate member 10 radially inwardly so that the arm 29 of the spring member 27 will be provided with a stop which has approximately the same height as that of the arm 28 in the axial direction.

In contrast to this, the arm 29 of the spring member 27, in accordance with FIG. 3, is inwardly bent at right angles in the axial direction in order to act upon the lower positioned intermediate disc member 15. In both cases, however, it is possible to produce the various frictional forces for the idling zone and for the load zone with one single embodiment of the spring member.

Figure 5:
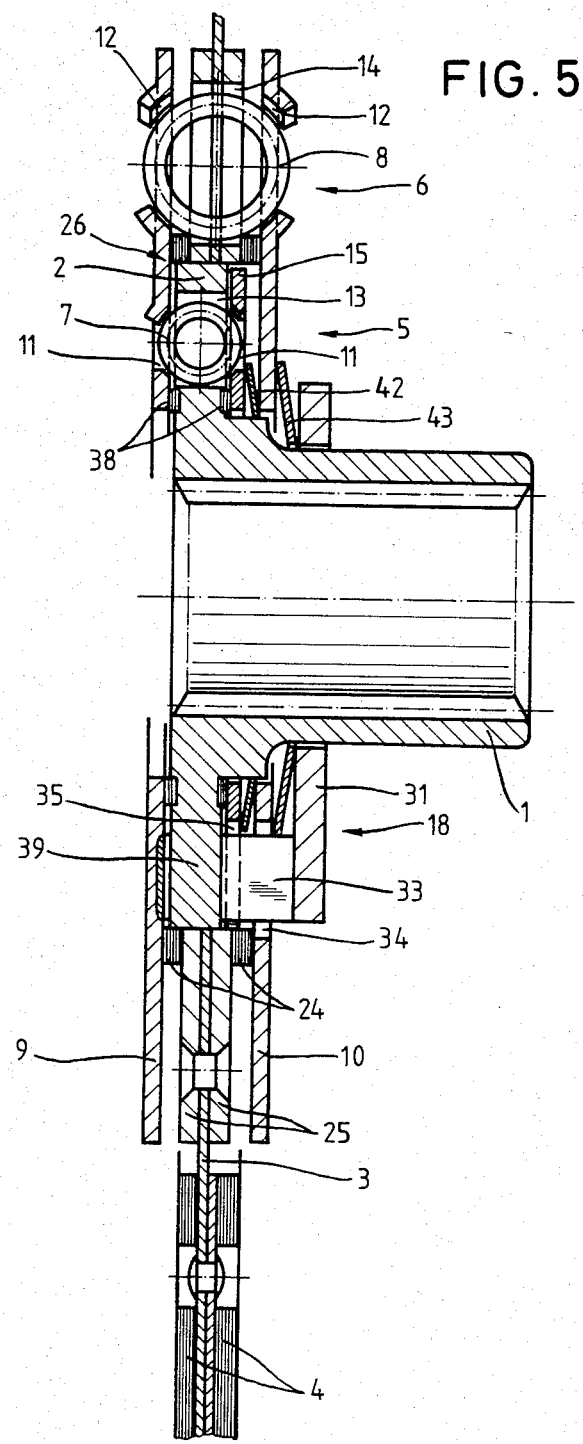
FIG. 5 is a sectional view of the invention taken along the line V—V of FIG. 6 showing a further embodiment of the invention.
Figure 6:
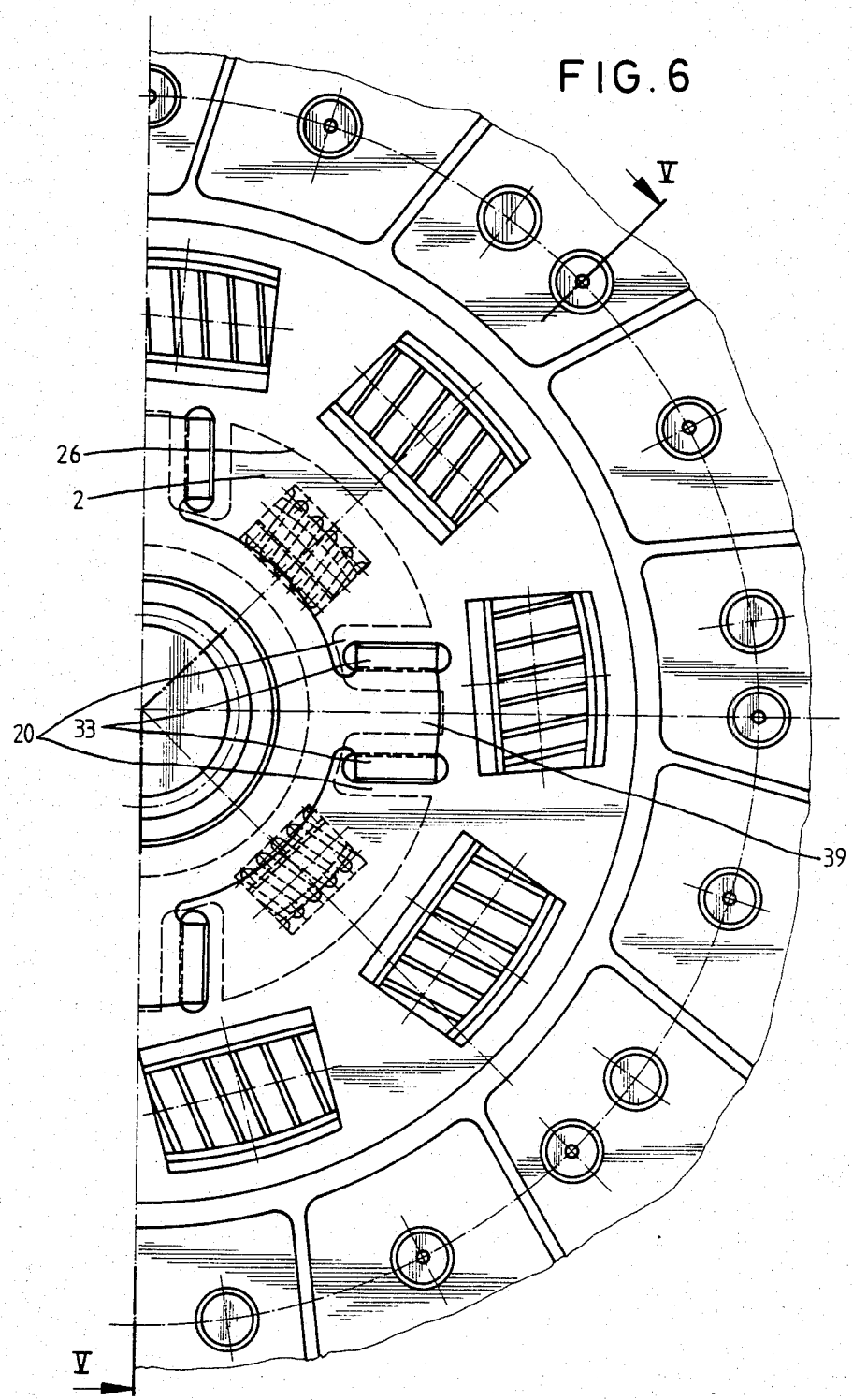
FIG. 6 is a partial axial view of the clutch disc assembly shown in FIG. 5.

A further embodiment of the invention is shown in FIGS. 5 and 6 and since many similarities exist between this embodiment and the embodiments of FIGS. 1–4, the following description will deal essentially with the differences in construction, since many of the members are similar with respect to design and operation.

In contrast with the structure in accordance with the embodiments of FIGS. 1–4, in FIG. 5 the coupling means embodied by the bolts 16 are replaced with a single structural component member which is shown individually in FIGS. 8–11 as comprising bracket means formed as a tab plate or ring 17 and 18, respectively. Both of the embodiments of the bracket means shown in FIGS. 8, 9, and 10, 11 are formed as stamped sheet parts wherein axially projecting tabs 32 and 33, respectively, are provided by bending from a base body 31 in the axial direction. The embodiments referred to differ only in that in one, in accordance with FIGS. 8 and 9, the tabs 32 are axially bent from an originally radially extending position whereas, in the embodiment according to FIGS. 10 and 11, the tabs 33 are axially bent from an originally tangentially extending position relative to the base body 31. Particularly, the bracket member 18 according to FIGS. 10 and 11 will be explained in more detail in connection with the clutch disc assembly according to FIGS. 5 and 6.

As shown in FIGS. 5 and 6, the coupling means of the assembly comprise the bracket member 18 shown in more detail in FIGS. 10 and 11. The bracket member 18 is engaged in the clutch assembly with its tabs 33 inserted from the side of the plate member 10. The tabs 33 project axially from the base body 31 as two parallel pieces in each instance and serve to rotatively connect the two plate members 9 and 10 and the intermediate member 15 as well as for transmission of torque when the idling damper 5 is bridged. For this purpose, windows 34 are arranged in the plate member 10 and windows 35 are arranged in the intermediate disc member 15. As is particularly evident from FIG. 6, the flange 2 is formed with windows 20 arranged in pairs in which the tabs 33 engage with some play in the circumferential direction. A finger 39 is located between each pair of windows 20 in the flange 2. As a result of this design of the windows 20 and the flange 2, all the tabs 33 which are provided contact corresponding walls of the windows 20 in both rotational directions and thus safely transmit torque even with respect to the employment of the invention in clutch discs of trucks.

Figure 7:
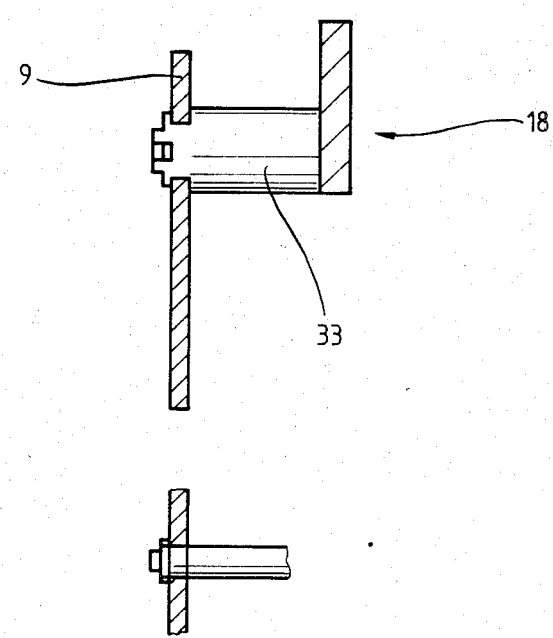
FIG. 7 is a partial sectional view of the invention showing a further variation of the coupling means thereof.
Figure 8:
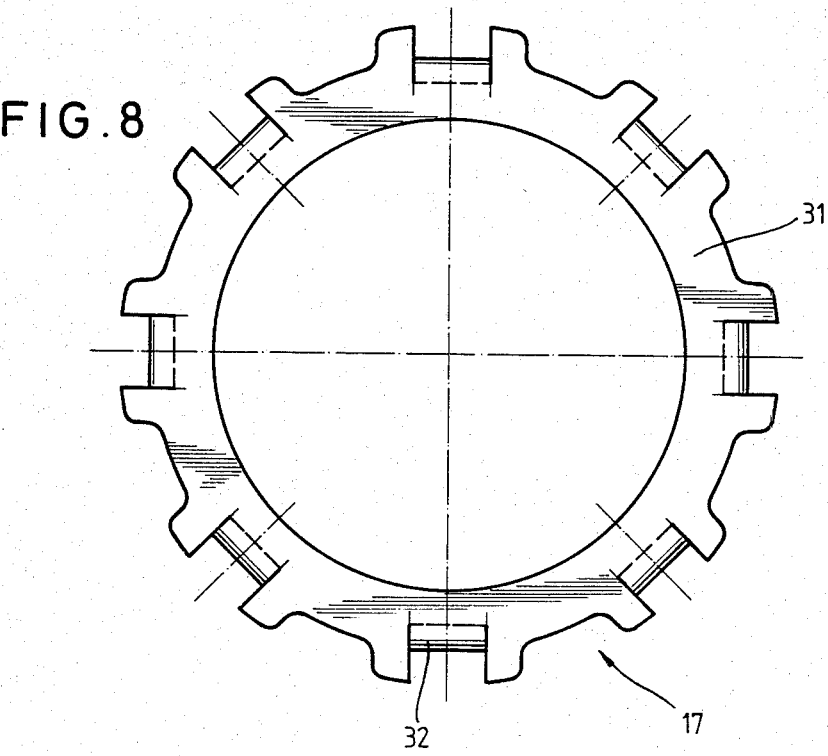
FIG. 8 is an axial view of a further embodiment of the coupling means of the invention.
Figure 9:
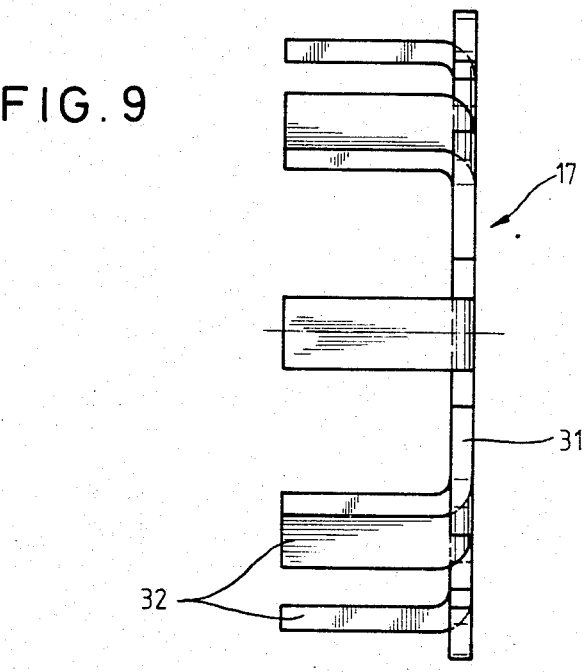
FIG. 9 is an edge view of the coupling means shown in FIG. 8.

In accordance with FIG. 5, the bracket member 18 is welded by means of resistance welding in the plate member 9 with the ends of the tabs 33 directed away from the base body 31. However, as will be seen from FIG. 7, it is also possible to rivet the tabs 33 in the plate member 9, for which purpose the tabs 33 must penetrate into corresponding openings in the plate member 9, at least to a partial extent. It is to be noted that in the arrangement of the bracket means, the rotative connection of the two plate members 9 and 10 with each other and relative to the disc member 15 is effected by means of windows or openings 34 and 35 with no play in the circumferential direction relative to the tabs 33.

The production of directed contact pressures for producing the frictional forces in the idling and load zones is effected by means of plate springs 42 and 43, respectively, which are arranged concentrically relative to the rotational axis of the torsional oscillation damper. The plate springs 42 are supported on the inside of the plate member and on the outside of the disc member 15 and thus produce, in connection with the friction discs 38, the frictional force for the idling damper 5, while the plate spring 43 is supported between the outside of the plate member 10 and the base body 31 of the bracket member 18 and, in connection with the friction discs 24, ensures friction for the load damper 6.

From the foregoing, it will be seen that the present invention is directed toward provision of a clutch disc assembly particularly suitable for a motor vehicle, with the assembly comprising a hub 1 from whose circumference a discshaped annular flange 2 radially projects and is rotatively fixed. A friction pad carrier means 3 is radially and rotatably guided on the annular flange 2, with the friction pad carrier 3 carrying a first plate member 9 and a second plate member 10 on axially opposite sides thereof, with the plate members 9 and 10 extending past the annular flange 2 in the radial direction. A third member in the form of the disc member 15 is arranged between the annular flange 2 and the plate member 10. The compression springs 8 of the rotational oscillation damper 6 operate for load operation and are arranged in windows or openings 12, 14 of the first and second plate members 9 and 10 and of the friction pad carrier 3, with the compression springs 8 being elastic in the circumferential direction. The compression springs 7 of the rotational oscillation damper 5 are adapted for idling operation and are arranged in the windows or openings 11, 13 of the plate member 9 and the disc member 10, the compression springs 7 being elastic in the circumferential direction.

The three members 9, 10, and 15 are rotatively joined together with one another by means of the coupling means 16. The coupling means 16 extend through recesses 19 of the annular flange 2 with some circumferential play and after compensation for the circumferential play, the coupling means 16 will bridge the rotational oscillation damper 5 for idling operation.

The members 10 and 15 are supported on the coupling elements so as to be axially movable and they are prestressed by the springs 21, 23 in order to produce a frictional damping force against the annular flange 2 and the friction pad carrier 3, respectively.

While specific embodiments of the invention have been shown and described in detail to illustrate the application of the inventive principles, it will be understood that the invention may be embodied otherwise without departing from such principles.

What is claimed is:

1. A clutch disc assembly for a motor vehicle comprising: a hub having a radially projecting annular flange affixed thereto; annular friction pad means coaxially arranged with said hub for torque transmission therebetween; annular plate means comprising a pair of annular plate members arranged on axially opposite sides of both said friction pad means and said annular flange; annular disc means comprising an annular disc member axially adjacent said annular flange and arranged between said annular flange and one of said annular plate members; said annular plate means and said annular disc means being rotatably mounted relative to said hub; coupling means rotatively connecting together said annular plate means and said annular disc means, said coupling means being arranged in rotative driving engagement with said hub with angular play being provided therebetween; load damper means operatively interposed between said annular friction pad means and said annular plate means; idler damper means operatively interposed between said annular flange and said annular disc means; said idler damper means being located radially inwardly of said load damper means within openings formed in said annular flange with at least one of said annular plate members extending radially alongside said idler damper means; and indentation means formed in said annular plate means and in said annular disc means for holding said idler damper means within said openings of said annular flange; wherein said coupling means are fastened on one of said annular plate members, wherein the other of said annular plate members and said disc member are guided to be nonrotatable but axially displaceable relative to said coupling means, wherein said coupling means are provided with support elements on an axially remote side of said one plate member, wherein compression springs are provided in engagement between said support elements and said other plate member and said disc member to produce damping frictional forces; and wherein said compression springs comprise twin-armed spring elements held on said coupling means, said twin-armed spring elements including a first arm supported on said other plate member and a second arm supported on said disc member.

2. An assembly according to claim 1 wherein said coupling means extend through elongated openings in said annular flange with play in the circumferential direction of said clutch assembly.

3. An assembly according to claim 1 wherein at least one of said compression springs is gripped between said support elements and the other of said plate members and wherein at least one other of said springs is gripped between said other plate member and said disc member.

4. An assembly according to claim 1 wherein said disc member includes a collar projecting axially from an inner edge thereof, said collar extending into a hub opening formed in said other plate member, said collar being contacted with said second arm of said twin-armed spring element.

5. An assembly according to claim 1 wherein said coupling means comprise bracket means formed as a sheet metal annular disc having an outer circumference and having tabs which are axially bent to extend from said outer circumference.

6. An assembly according to claim 5 wherein said tabs are bent along a bending line which extends tangentially to said outer circumference of said bracket means.

7. An assembly according to claim 5 wherein said tabs are bent along a bending line which extends approximately radially of said outer circumference of said bracket means.

8. An assembly according to claim 5 wherein said tabs are bent in pairs.

9. An assembly according to claim 5 wherein said bracket means is arranged on a side of said other plate member and wherein said tabs extend through openings in said other plate member and in said disc member, said tabs being rigidly connected to said one plate member at remote ends thereof.

10. An assembly according to claim 1 wherein said friction pad means is radially guided at an inner circumference thereof on the outer circumference of said annular flange of said hub.

11. An assembly according to claim 10 wherein said friction pad means are arranged to be axially movable relative to said hub, said assembly including friction disc means arranged between said friction pad means and said annular plate means as well as between said annular flange and said one of said plate members and said disc member.

12. An assembly according to claim 11 wherein said friction pad means are provided with reinforcement sheets at least in the areas of said friction disc means.

13. An assembly according to claim 1 wherein said idler damper means comprise a plurality of idler dampers arranged circumferentially about said hub and wherein said coupling means comprise individual coupling elements arranged circumferentially between said idler dampers, said idler dampers and said coupling elements lying in a circular path extending about said hub.

14. An assembly according to claim 1 wherein said coupling means comprise a plurality of bolt members each having one end fixedly connected with one of said annular plate members and extending through an elongated opening in said annular flange to provide said circumferential play therebetween and through openings in each of said annular disc member and the other of said annular plate members, said bolts being arranged with spring members connected between said bolts and said other plate member to effect frictional forces between said friction pad means and said annular plate means.

15. A clutch disc assembly for a motor vehicle friction clutch comprising:
   a hub defining a rotational axis and having a radially projecting annular flange affixed thereto;
   annular friction pad means coaxially rotatable with said hub for torque transmission therebetween, said friction pad means including a friction pad carrier having an inside circumference radially guided about said annular flange;
   annular plate means comprising a first and a second annular plate member arranged on axially opposite sides of said friction pad carrier, each of said plate members radially overlapping said friction pad carrier and said annular flange and being rotatable relative thereto;
   annular disc means comprising an annular disc member rotatable relative to said members flange arranged between said annular flange and one of said annular plate members;
   connecting members extending axially in the area of said annular flange and retained on said first annular plate member and guiding said second annular plate member and said annular disc member so as to be axially displaceable while at the same time fastening said first and second annular plate members and said disc member together so as to be rotatable relative to each other;
   abuttment recesses in said annular flange through which said connecting members extend with clearance in the circumferential direction of said hub and which limit the turning movement of said annular plate means and said annular disc means relative to said annular flange;
   first torsional vibration damper means for operation under load including a plurality of compression springs acting in a circumferential direction of said hub operatively interposed between said friction pad carrier and said first and second annular plate members;
   second torsional vibration damper means for idling operating including a plurality of compression springs acting in the circumferential direction of said hub operatively interposed between said first annular plate member and said annular disc member radially inwardly of said first torsion vibration damper means and retained within openings formed in said annular flange, said first annular plate member and said annular disc member;
   abuttment retained at said connecting members on that side of said second annular plate member facing axially away from said first annular plate member; and
   axially acting compression spring means axially arranged between said abuttment members and one of said second annular plate member and said annular disc member for generating frictional damping forces during operation of said clutch disc assembly under load between said friction pad carrier and said first and second annular plate members as well as friction damping forces during idling between said annular flange and said annular disc member.

16. An assembly according to claim 15 wherein said compression spring means comprise a compression spring engaged between said abutment members and said second annular plate member and a compression spring engaged between said second annular plate member and said annular disc member.

17. An assembly according to claim 15 wherein said compression spring means comprise twin-armed spring elements held on said connecting members, said twin-armed spring elements including a first arm supported on said second annular plate member and a second arm supported on said annular disc member.

18. An assembly according to claim 17 wherein said annular disc member includes a collar projecting axially from an inner edge thereof, said collar extending into a hub opening formed in said second annular plate member, said collar being contacted with second arm of said twin-armed spring element.

19. An assembly according to claim 15 wherein said connecting members comprise bracket means formed as a sheet metal annular disc having an outer circumference and tabs which are axially bent to extend from said outer circumference.

20. An assembly according to claim 19 wherein said tabs are bent along a bending line which extends tangentially to said outer circumference of said bracket means.

21. An assembly according to claim 19 wherein said tabs are bent along a bending line which extends approximately radially of said outer circumference of said bracket means.

22. An assembly according to claim 19 wherein said tabs are bent in pairs.

23. An assembly according to claim 19 wherein said bracket means is arranged on a side of said second annular plate member and wherein said tabs extend through openings in said second annular plate member and in said annular disc member, said tabs being rigidly connected to said first annular plate member at remote ends thereof.

24. An assembly according to claim 15 wherein said second torsional vibration damper means comprise a plurality of idler dampers arranged circumferentially about said hub and wherein said connecting members comprise individual connecting elements arranged circumferentially between said idler dampers, said idler dampers and said connecting elements lying in a circular path extending about said hub.

25. An assembly according to claim 15 wherein said connecting members comprise a plurality of bolt members each having one end fixedly connected to said first annular plate member and extending through said abutment recesses to provide said clearance in the circumferential direction, said bolt members extending through openings in said annular disc member and through openings in said second annular plate member.

* * * * *